(12) United States Patent
Kuriyagawa et al.

(10) Patent No.: US 8,366,500 B2
(45) Date of Patent: Feb. 5, 2013

(54) OUTBOARD MOTOR CONTROL APPARATUS

(75) Inventors: Koji Kuriyagawa, Saitama (JP); Hajime Yoshimura, Saitama (JP); Hikaru Ikeda, Saitama (JP); Yoshiyuki Matsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 12/580,650

(22) Filed: Oct. 16, 2009

(65) Prior Publication Data
US 2010/0099309 A1 Apr. 22, 2010

(30) Foreign Application Priority Data

Oct. 20, 2008 (JP) .................................. 2008-270213

(51) Int. Cl.
*B63H 21/22* (2006.01)
(52) U.S. Cl. .................. 440/1; 440/75; 440/84
(58) Field of Classification Search ................ 440/1, 75, 440/84
See application file for complete search history.

(56) References Cited

U.S. PATENT DOCUMENTS

| | | | |
|---|---|---|---|
| 4,558,769 A * | 12/1985 | Neisen | 192/3.31 |
| 4,887,984 A | 12/1989 | Newman | |
| 5,095,776 A | 3/1992 | Sato | |
| 5,199,326 A | 4/1993 | Iwatsuki et al. | |
| 5,336,120 A * | 8/1994 | Maurer et al. | 440/84 |
| 5,754,969 A | 5/1998 | Ando et al. | |
| 6,095,117 A | 8/2000 | Minowa et al. | |
| 6,481,390 B1 | 11/2002 | Robb | |
| 6,513,463 B2 | 2/2003 | Katayama | |
| 6,520,147 B1 | 2/2003 | Kanno | |
| 6,644,933 B2 | 11/2003 | Light et al. | |
| 6,695,743 B2 | 2/2004 | Tanaka et al. | |
| 6,709,302 B2 | 3/2004 | Yanagihara | |
| 6,884,133 B2 | 4/2005 | Ishii | |
| 6,899,575 B1 | 5/2005 | Rothe et al. | |
| 6,918,803 B2 | 7/2005 | Shomura | |
| 7,121,233 B2 | 10/2006 | Kitamura et al. | |
| 7,214,164 B2 | 5/2007 | Shomura et al. | |
| 7,578,713 B2 * | 8/2009 | Miyata et al. | 440/75 |
| 7,704,183 B2 | 4/2010 | Nakamura et al. | |
| 7,744,435 B2 | 6/2010 | Ide et al. | |
| 2002/0173895 A1 * | 11/2002 | Kitaori et al. | 701/51 |
| 2005/0230207 A1 | 10/2005 | Tsunekawa | |
| 2007/0293103 A1 | 12/2007 | Kinoshita et al. | |

FOREIGN PATENT DOCUMENTS

EP  1 860 347 A2  11/2007
(Continued)

*Primary Examiner* — Stephen Avila
(74) *Attorney, Agent, or Firm* — Carrier Blackman & Associates, P.C.; Joseph P. Carrier; William D. Blackman

(57) ABSTRACT

In an apparatus for controlling an outboard motor having an internal combustion engine to power a propeller, and a torque converter interposed between the engine and a drive shaft and equipped with a lockup clutch, it is configured to have a throttle opening detector that detects throttle opening of a throttle valve of the engine, a throttle opening change amount calculator that calculates a change amount of the calculated throttle opening, and a clutch ON unit that makes the lockup clutch ON when the calculated change amount is equal to or greater than a predetermined value, and keeps the lockup clutch ON during a predetermined time period. With this, it becomes possible to improve acceleration performance immediately after the engine speed is accelerated.

7 Claims, 6 Drawing Sheets

FOREIGN PATENT DOCUMENTS

| JP | 0 430 675 A2 | 6/1991 |
| JP | 2004-068704 A | 3/2004 |
| JP | 2007-315495 A | 12/2007 |
| JP | 2007-315498 | 12/2007 |

* cited by examiner

US 8,366,500 B2

OUTBOARD MOTOR CONTROL APPARATUS

BACKGROUND OF THE INVENTION

1. Field of the Invention

This invention relates to an outboard motor control apparatus, particularly to an apparatus for controlling an outboard motor having a torque converter.

2. Description of the Related Art

In recent years, there is proposed an outboard motor having a torque converter interposed between an internal combustion engine and drive shaft to amplify output torque of the engine and then transmit it to the drive shaft for enhancing acceleration performance, etc., as taught, for example, by Japanese Laid-Open Patent Application No. 2007-315498 ('498).

However, in the outboard motor having the torque converter as in the reference, it disadvantageously takes time until starting to increase in the boat speed after the engine speed is accelerated. Specifically, due to slippage of the torque converter, transmittance of an engine output to the drive shaft immediately after the engine speed is accelerated is slightly delayed starting compared to the case of using an outboard motor having an engine directly connected to a drive shaft, so that it takes time until the boat speed starts increasing and there is room for improvement in acceleration performance.

SUMMARY OF THE INVENTION

An object of this invention is therefore to overcome the foregoing drawback by providing an apparatus for controlling an outboard motor having a torque converter, which apparatus can improve acceleration performance immediately after speed of an engine is accelerated.

In order to achieve the object, this invention provides an apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising a throttle opening detector that detects throttle opening of a throttle valve of the engine, a throttle opening change amount calculator that calculates a change amount of the calculated throttle opening, and a clutch ON unit that makes the lockup clutch ON when the calculated change amount is equal to or greater than a predetermined value, and keeps the lockup clutch ON during a predetermined time period.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of an outboard motor control apparatus according to the invention will now be explained with reference to the attached drawings.

Figure 1:
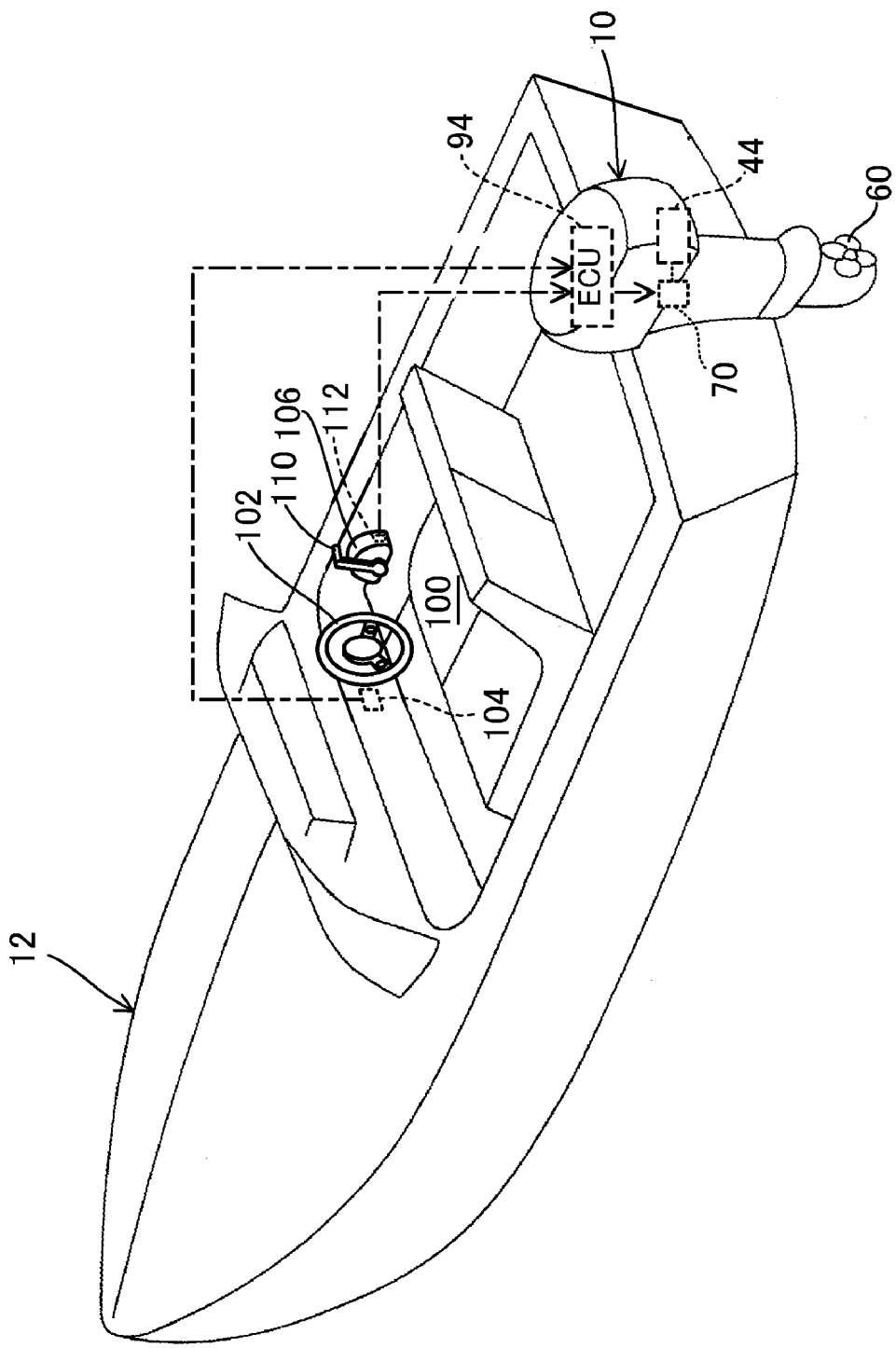
FIG. 1 is an overall schematic view of an outboard motor control apparatus including a boat (hull) according to an embodiment of the invention.
Figure 2:
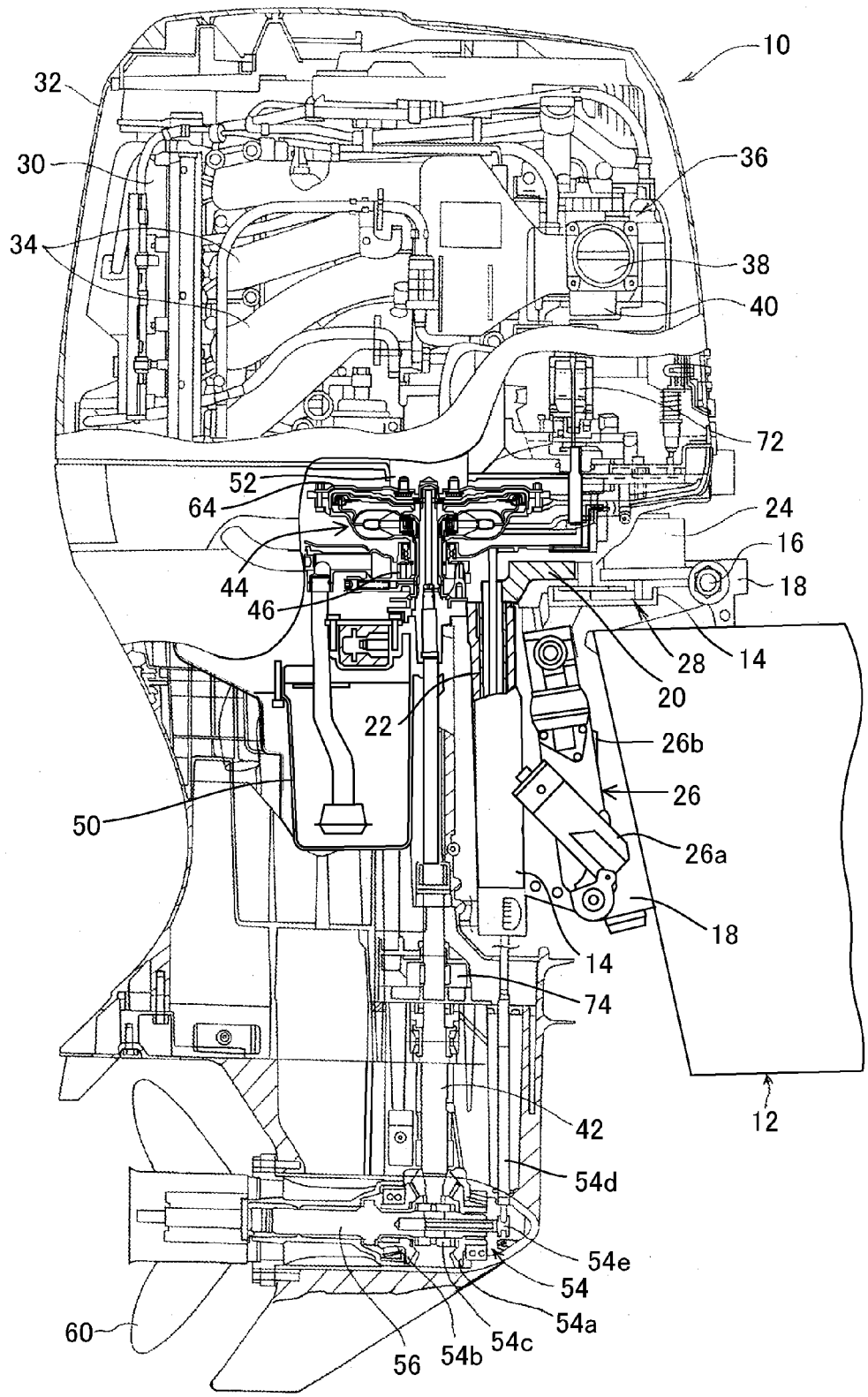
FIG. 2 is a sectional side view partially showing the outboard motor shown in FIG. 1.

FIG. 1 is an overall schematic view of an outboard motor control apparatus including a boat (hull) according to an embodiment of the invention. FIG. 2 is a sectional side view partially showing the outboard motor shown in FIG. 1 and FIG. 3 is an enlarged side view of the outboard motor.

Figure 3:
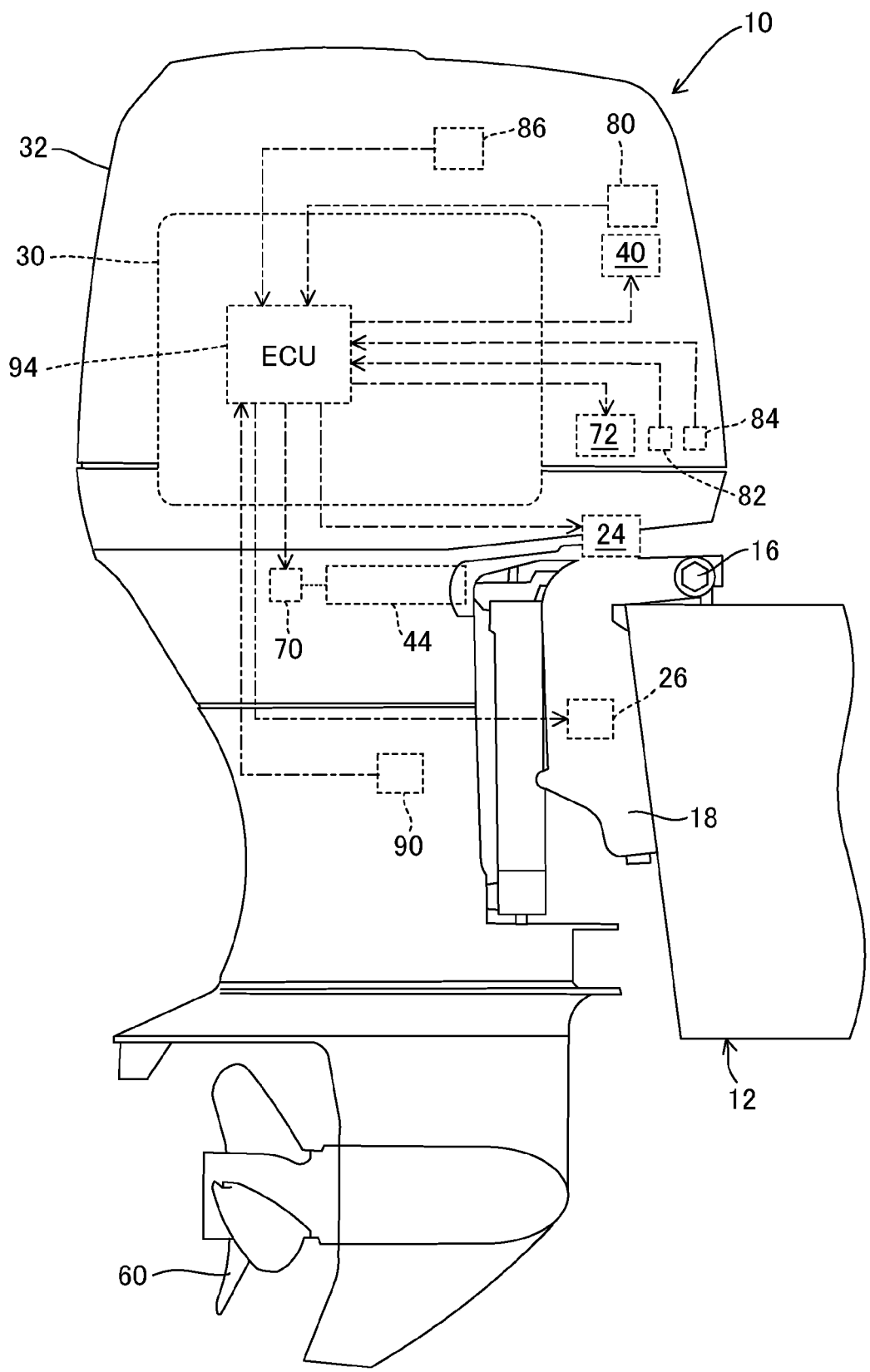
FIG. 3 is an enlarged side view of the outboard motor shown in FIG. 1.

In FIGS. 1 to 3, a symbol 10 indicates an outboard motor. As illustrated, the outboard motor 10 is clamped (fastened) to the stern or transom of a boat (hull) 12.

As shown in FIG. 2, the outboard motor 10 is fastened to the boat 12 through a swivel case 14, tilting shaft 16 and stern brackets 18. The outboard motor 10 is equipped with a mount frame 20 and shaft 22. The shaft 22 is housed in the swivel case 14 to be rotatable about the vertical axis such that the outboard motor 10 can be rotated about the vertical axis relative to the boat 12. The mount frame 20 is fixed at its upper end and lower end to a frame (not shown) constituting a main body of the outboard motor 10.

An electric steering motor (actuator) 24 for operating the shaft 22 and a power tilt-trim unit 26 for regulating a tilt angle and trim angle of the outboard motor 10 are installed near the swivel case 14. The output shaft of the steering motor 24 is connected to the upper end of the mount frame 20 via a speed reduction gear mechanism 28. Specifically, a rotational output of the steering motor 24 is transmitted to the mount frame 20 via the speed reduction gear mechanism 28, whereby the outboard motor 10 is steered about the shaft 22 as a steering axis to the right and left directions (steered about the vertical axis).

The power tilt-trim unit 26 integrally comprises a hydraulic cylinder 26a for adjusting the tilt angle and a hydraulic cylinder 26b for adjusting the trim angle. When the hydraulic cylinders 26a, 26b are extended and contracted, the swivel case 14 is rotated about the tilting shaft 16 as a rotational axis, thereby tiling up/down and trimming up/down the outboard motor 10.

An internal combustion engine (hereinafter referred to as the "engine") 30 is disposed in the upper portion of the outboard motor 10. The engine 30 comprises a spark-ignition, water-cooling gasoline engine with a displacement of 2,200 cc. The engine 30 is located above the water surface and covered by an engine cover 32.

An intake pipe 34 of the engine 30 is connected to a throttle body 36. The throttle body 36 has a throttle valve 38 installed therein and an electric throttle motor (actuator) 40 for opening and closing the throttle valve 38 is integrally disposed thereto.

The output shaft of the throttle motor 40 is connected to the throttle valve 38 via a speed reduction gear mechanism (not shown) disposed near the throttle body 36. The throttle motor 40 is operated to open and close the throttle valve 38, thereby regulating the flow rate of the air sucked in the engine 30 to control the engine speed NE.

The outboard motor 10 further comprises a drive shaft (vertical shaft) 42 installed parallel with the vertical axis to be rotatably supported, a torque converter 44 interposed between the engine 30 and drive shaft 42, a hydraulic pump 46 that is attached to the drive shaft 42 and pumps operating oil to a lubricated portion of the engine 30, the torque converter 44 and the like, and a reservoir 50 for reserving the operating oil.

The upper end of the drive shaft 42 is connected to a crankshaft 52 of the engine 30 through the torque converter 44 and the lower end thereof is connected via a shift mechanism 54 with a propeller shaft 56 supported to be rotatable about the horizontal axis. One end of the propeller shaft 56 is attached with a propeller 60. Thus the drive shaft 42 connects the engine 30 with the propeller 60.

Figure 4:
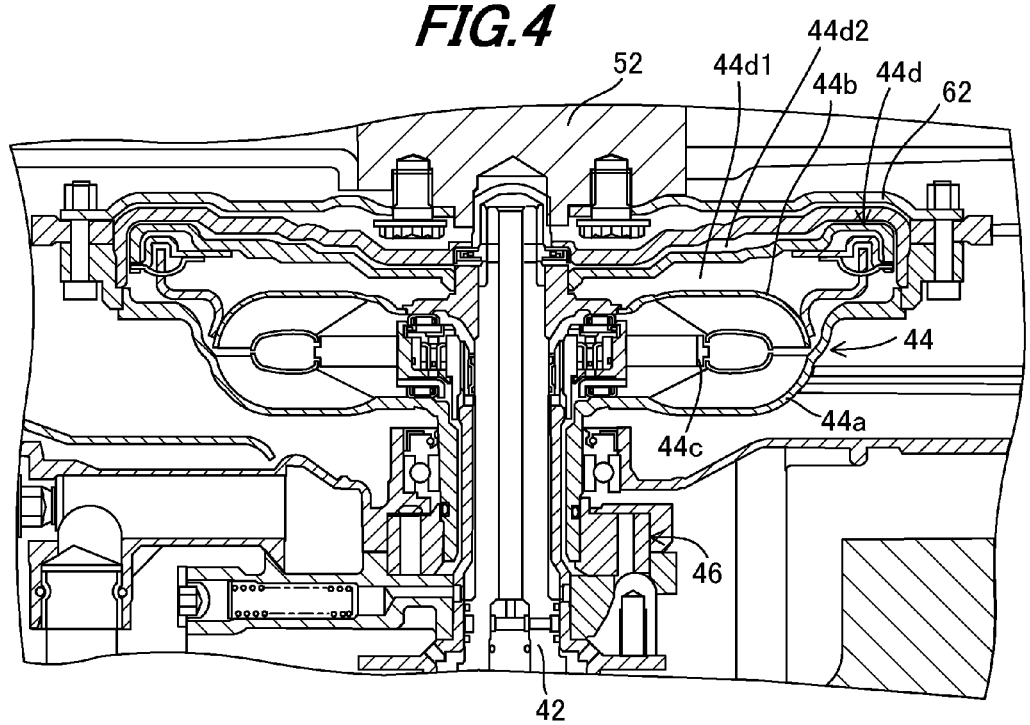
FIG. 4 is an enlarged sectional view showing a region around a torque converter shown in FIG. 2.

FIG. 4 is an enlarged sectional view showing a region around the torque converter 44 shown in FIG. 2.

As shown in FIG. 4, the torque converter 44 includes a pump impeller 44a connected to the crankshaft 52 through a drive plate 62, a turbine runner 44b that is installed to face the pump impeller 44a to receive/discharge the operating oil and connected to the drive shaft 42, a stator 44c installed between the pump impeller 44a and turbine runner 44b, a lockup clutch 44d and other components.

Figure 5:
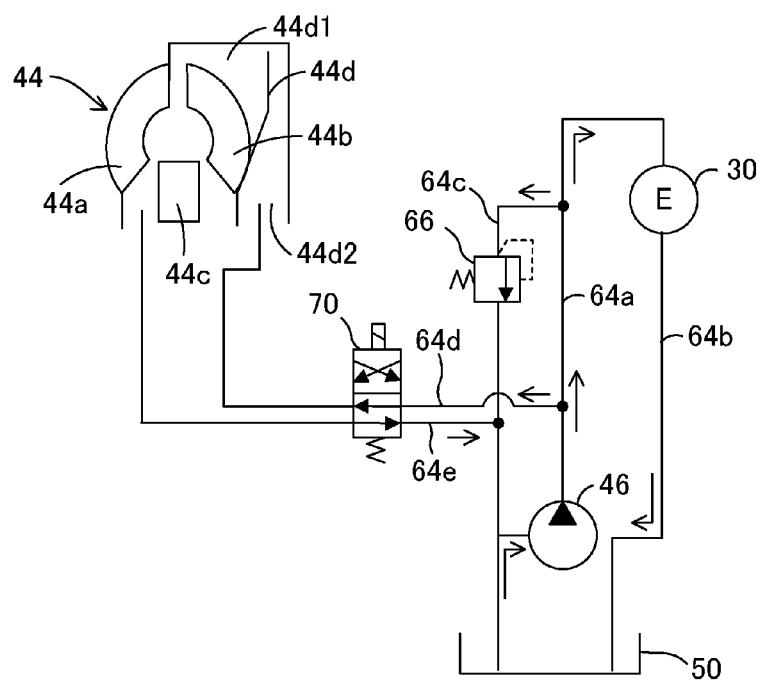
FIG. 5 is a hydraulic circuit diagram schematically showing the torque converter, a hydraulic pump and other components shown in FIG. 2.

FIG. 5 is a hydraulic circuit diagram schematically showing the torque converter 44, hydraulic pump 46, etc.

The hydraulic pump 46 driven by the engine 30 pumps up the operating oil in the reservoir 50 and forwards it to a first oil passage 64a. The pressurized operating oil forwarded to the first oil passage 64a is supplied to the lubricated portion of the engine 30 or the like and then returns to the reservoir 50 through a second oil passage 64b.

The first oil passage 64a is provided with a third oil passage 64c connecting the first oil passage 64a with an intake hole of the hydraulic pump 46. The third oil passage 64c is interposed with a relief valve 66 that opens when the pressure of the operating oil supplied to the engine 30 is at or above a defined value and closes when it is below the defined value.

A fourth oil passage 64d for circulating the operating oil supplied to the torque converter 44 is connected to the first oil passage 64a at a point between a discharge hole of the hydraulic pump 46 and a branch point of the first and third oil passages 64a, 64c. A fifth oil passage 64e for circulating the operating oil returning from the torque converter 44 to the hydraulic pump 46 is connected to the third oil passage 64c at a location downstream of the relief valve 66. The fourth and fifth oil passages 64d, 64e are installed with a lockup control valve 70 for controlling the operation of the lockup clutch 44d.

The lockup control valve 70 is a solenoid valve. The output of the valve 70 is connected to a piston chamber 44d1 of the lockup clutch 44d of the torque converter 44, and also connected to a chamber (rear chamber) 44d2 disposed in the rear of the piston chamber 44d1. The lockup control valve 70 switches the oil passage upon being magnetized/demagnetized, thereby controlling the ON/OFF state (engagement/release) of the lockup clutch 44d.

Specifically, when the lockup control valve 70 is magnetized, the operating oil is supplied to the piston chamber 44d1 and discharged from the rear chamber 44d2 so as to make the lockup clutch 44d ON (engaged), and when the valve 70 is demagnetized (the status in FIG. 5; initial condition), the operating oil is supplied to the rear chamber 44d2 and discharged from the piston chamber 44d1 so as to make the lockup clutch 44d OFF (released). Since the details of the aforementioned torque converter 44 is disclosed in '498, further explanation is omitted here.

The explanation of FIG. 2 will be resumed. The shift mechanism 54 comprises a forward bevel gear 54a and reverse bevel gear 54b which are connected to the drive shaft 42 to be rotated, a clutch 54c which can engage the propeller shaft 56 with either one of the forward bevel gear 54a and reverse bevel gear 54b, and other components.

The interior of the engine cover 32 is disposed with an electric shift motor (actuator) 72 that drives the shift mechanism 54. The output shaft of the shift motor 72 can be connected via a speed reduction gear mechanism (not shown) with the upper end of a shift rod 54d of the shift mechanism 54. Therefore, when the shift motor 72 is operated, its output appropriately displaces the shift rod 54d and a shift slider 54e to move the clutch 54c to one shift position from among a forward position, reverse position and neutral position.

When the shift position is forward or reverse, the rotational output of the drive shaft 42 is transmitted via the shift mechanism 54 to the propeller shaft 56 to rotate the propeller 60 in one of the directions making the boat 12 move forward or rearward. The outboard motor 10 is equipped with a power source (not shown) such as a battery or the like attached to the engine 30 to supply operating power to the motors 24, 40, 72, etc.

As shown in FIG. 3, a throttle opening sensor (throttle opening detector) 80 is installed near the throttle valve 38 and produces an output or signal indicative of opening of the throttle valve 38, i.e., throttle opening TH. A shift position sensor 82 installed near the shift rod 54d produces an output or signal corresponding to a shift position (neutral, forward or reverse) and a neutral switch 84 also installed near the shift rod 54d produces an ON signal when the shift position is neutral and an OFF signal when it is forward or reverse.

A crank angle sensor (engine speed detector) 86 is installed near the crankshaft 52 of the engine 30 and produces a pulse signal at every predetermined crank angle. A drive shaft rotation speed sensor 90 is installed near the drive shaft 42 and produces an output or signal indicative of rotation speed of the drive shaft 42.

The outputs of the foregoing sensors and switch are sent to an Electronic Control Unit (ECU) 94 disposed in the outboard motor 10. The ECU 94 has a microcomputer including a CPU, ROM, RAM and other devices and installed in the engine cover 32 of the outboard motor 10.

As shown in FIG. 1, a steering wheel 102 is installed near a cockpit (the operator's seat) 100 of the boat 12 to be manipulated or rotated by the operator. A steering angle sensor 104 installed near a shaft (not shown) of the steering wheel 102 produces an output or signal corresponding to the steering angle of the steering wheel 102.

A remote control box 106 provided near the cockpit 100 is equipped with a shift/throttle lever 110 installed to be manipulated by the operator. Upon manipulation, the lever 110 can be swung in the front-back direction from the initial position and is used by the operator to input a shift position change command and engine speed regulation command. A lever position sensor 112 is installed in the remote control box 106 and produces an output or signal corresponding to a position of the lever 110. The outputs of the sensors 104, 112 are also sent to the ECU 94.

Based on the inputted outputs, the ECU 94 controls the operations of the motors and ON/OFF state of the lockup clutch 44d of the torque converter 44.

Figure 6:
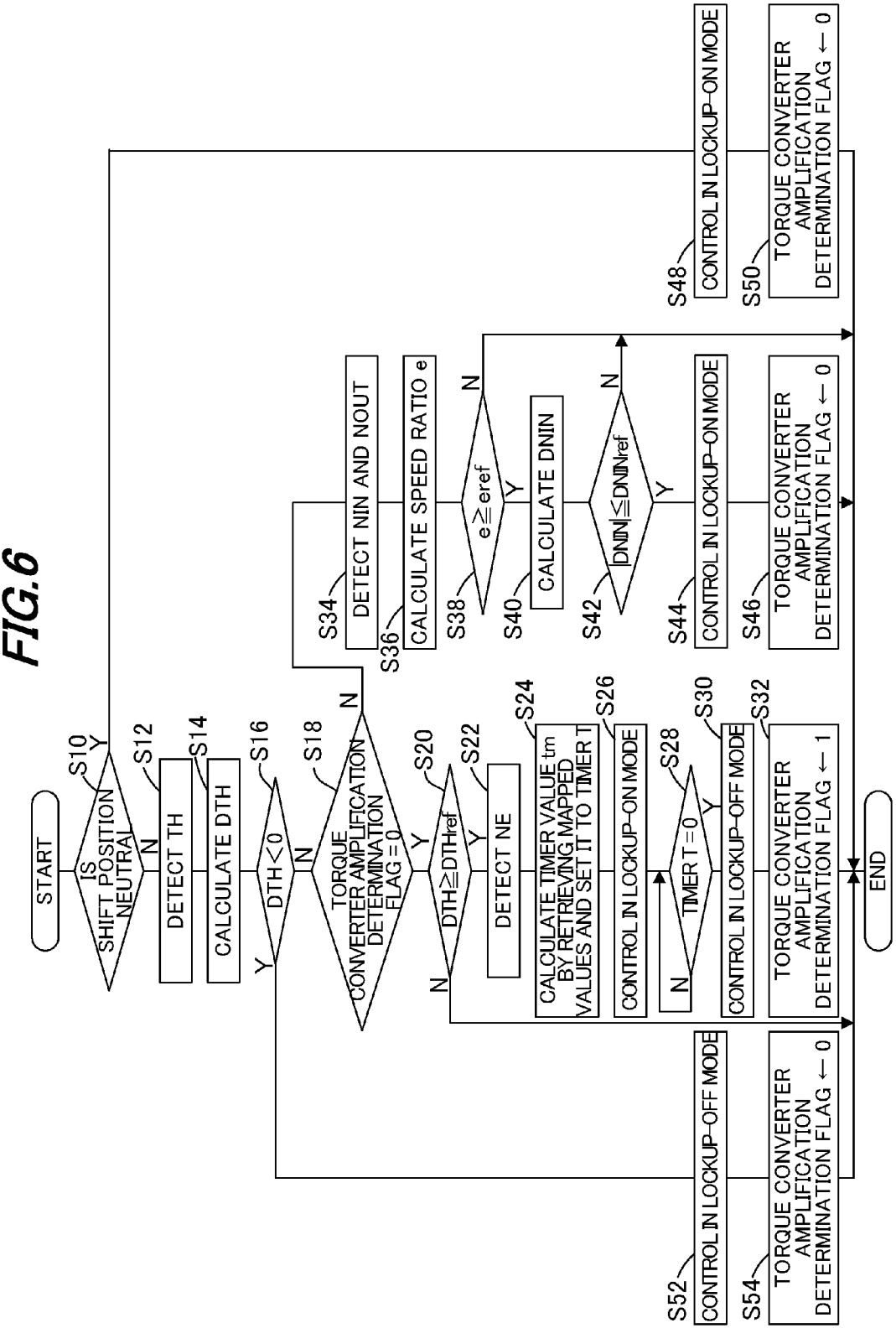
FIG. 6 is a flowchart showing the control of ON/OFF state of a lockup clutch of the torque converter shown in FIG. 1, etc.

FIG. 6 is a flowchart showing the control of ON/OFF state of the lockup clutch 44d. The illustrated program is executed by the ECU 94 at a predetermined interval, e.g., 100 milliseconds.

The program begins in S10, in which it is determined whether the shift position is neutral. This determination is made by checking as to whether the neutral switch 84 outputs the ON signal. When the result in S10 is negative, the program proceeds to S12, in which the throttle opening TH is detected or calculated from the output of the throttle opening sensor 80 and to S14, in which a change amount (variation) DTH of the detected throttle opening TH per a unit time (e.g., 500 milliseconds) is calculated.

The program proceeds to S16, in which it is determined whether the engine 30 is in a decelerating condition. The determination in S16 whether the engine 30 (precisely, the boat 12) is decelerating is made by checking as to whether the change amount DTH of the throttle opening TH is less than 0 degree. In other words, when the change amount DTH is a negative value, the engine 30 is determined to be decelerating and when the change amount DTH is 0 or a positive value, it is determined to be at a constant speed or accelerating.

When the result in S16 is negative, the program proceeds to S18, in which it is determined whether a bit of an amplification determination flag of the torque converter 44 (torque converter amplification determination flag) is 0. As explained below, the bit of this flag is set to 1 when a condition where the output torque of the engine 30 is amplified through the torque converter 44 and transmitted to the drive shaft 42 (i.e., where the operation of the outboard motor 10 is in a range (torque amplification range) that the torque is to be amplified by the torque converter 44 to accelerate the boat 12) is established, and reset to 0 when the output torque of the engine 30 is not amplified (i.e., the operation of the outboard motor 10 is out of the torque amplification range).

Since the initial value of the bit of the torque converter amplification determination flag is 0, the result in S18 in the first program loop is generally affirmative and the program proceeds to S20, in which it is determined whether the engine 30 is in an accelerating condition including abrupt acceleration. Specifically, the calculated change amount DTH of the throttle opening TH is compared with a predetermined value (threshold value) DTHref and, when the change amount DTH is equal to or greater than the predetermined value DTHref, the engine 30 is determined to be in the accelerating condition. The predetermined value DTHref is set to a value (e.g., 0.5 degree) enabling to determine whether the engine 30 is accelerating.

When the result in S20 is negative, i.e., the engine 30 is neither decelerating nor accelerating but the boat 12 cruises at a constant speed, the remaining steps are skipped and when the result is affirmative, the program proceeds to S22, in which the output pulse of the crank angle sensor 86 is counted to detect or calculate the engine speed NE.

Figure 7:
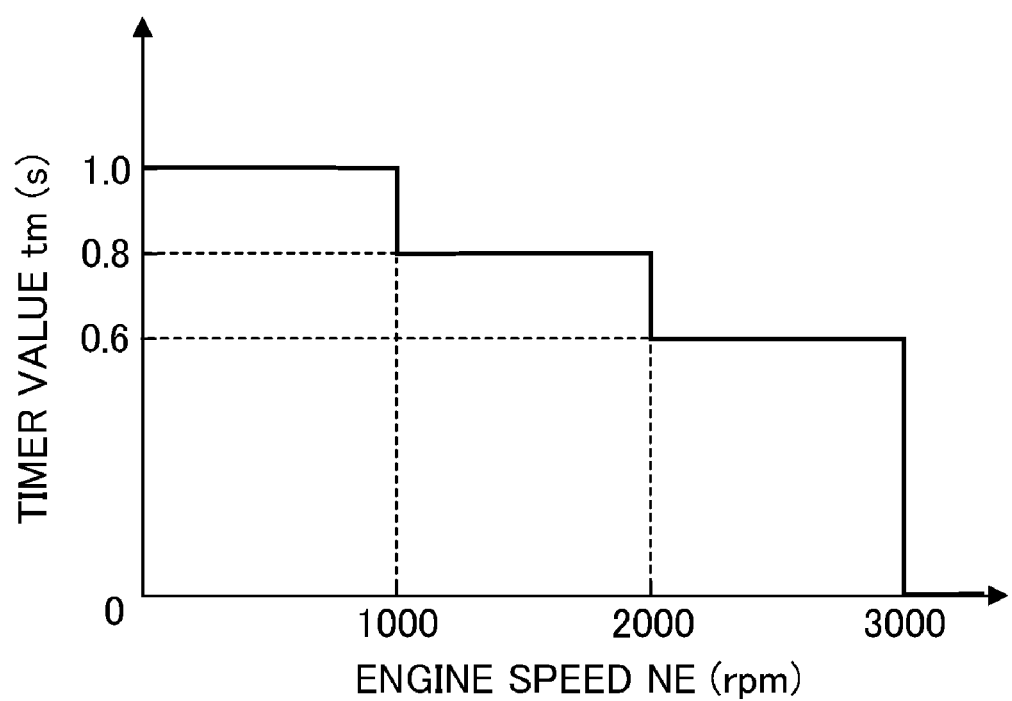
FIG. 7 is a graph showing table characteristics of timer values with respect to engine speed, which are used in the process of FIG. 6 flowchart.

The program proceeds to S24, in which a timer value tm is calculated by retrieving mapped values of a table (whose characteristics are shown in FIG. 7) using the detected engine speed NE, the calculated timer value tm is set to a timer T (down timer) and down-counting (time measurement) is started. As described below, the timer T is used to measure the time to hold the lockup clutch 44d to the ON state (i.e., the time until the lockup clutch 44d is made OFF) when the engine 30 is determined to be in the accelerating condition including abrupt acceleration, and the timer value tm is a value indicating a time period (predetermined time period) during which the lockup clutch 44d should be held ON.

As shown in FIG. 7, the timer value tm (predetermined time period) is changed depending on the engine speed NE. Specifically, when the engine speed NE is relatively low (0 to 1000 rpm), the timer value tm is set to 1.0 second and is decreased with increasing engine speed NE. Precisely, when the engine speed NE is 1000 to 2000 rpm, the timer value tm is set to 0.8 second, when the speed NE is 2000 to 3000 rpm, set to 0.6 second, and when the speed NE is equal to or greater than 3000 rpm, set to 0 second.

In other words, the time period (timer value tm) during which the lockup clutch 44d is held ON is changed or set to be relatively long at the low engine speed NE and relatively short at the high engine speed NE. The characteristics shown in FIG. 7 are experimentally obtained and stored in the ROM of the ECU 94 beforehand.

The program proceeds to S26, in which the torque converter 44 is controlled in a lockup-ON mode. The lockup-ON mode magnetizes the lockup control valve 70 to make the lockup clutch 44d ON. As a result, since the crankshaft 52 of the engine 30 and the drive shaft 42 are directly connected, slippage or the like of the torque converter 44 can be prevented and the speed of the boat 12 promptly starts increasing, thereby improving acceleration performance immediately after the engine 30 is accelerated.

Next, the program proceeds to S28, in which it is determined whether a value of the timer T became 0. So far as the result in S28 is negative, the determination of S28 is repeated (i.e., the lockup-ON mode is continued) and when the result is affirmative, the program proceeds to S30, in which the torque converter 44 is controlled in a lockup-OFF mode. The lockup-OFF mode demagnetizes the lockup control valve 70 to make the lockup clutch 44d OFF.

Thus, the lockup clutch 44d is held ON during the predetermined time period (timer value tm) immediately after acceleration of the engine 30 and made OFF after elapse of the predetermined time period (i.e., when the value of the timer T became 0). Owing to this configuration, the output torque of the engine 30 is amplified by the torque converter 44 and transmitted to the drive shaft 42, thereby further improving acceleration performance.

The program proceeds to S32, in which a bit of the torque converter amplification determination flag is set to 1 and the present program loop is terminated. Since the bit of this flag is set to 1, the result in S18 in the next and subsequent loops is negative and the program proceeds to S34.

In S34, an input rotation speed NIN and output rotation speed NOUT of the torque converter 44 are detected or calculated. Since the input rotation speed NIN is identical with the engine speed NE because the input side of the torque converter 44 is connected to the crankshaft 52 of the engine 30, it is detected by counting the output pulses of the crank angle sensor 86. The output rotation speed NOUT is detected from the output of the drive shaft rotation speed sensor 90.

The program proceeds to S36, in which a speed ratio e of the torque converter 44 is calculated based on the input rotation speed NIN and output rotation speed NOUT. The speed ratio e is a value obtained by dividing the output rotation speed NOUT by the input rotation speed NIN as shown in the following equation.

Speed ratio $e$=(Output rotation speed $NOUT$)/(Input rotation speed $NIN$)

The program proceeds to S38, in which it is determined whether the torque amplification range is ended, precisely, whether the torque amplification range (acceleration range) is saturated and the acceleration is completed. Specifically, the calculated speed ratio e is compared with a torque converter reference value (threshold value) eref to determine whether the speed ratio e is equal to or greater than the reference value eref, and when the result is affirmative, it is determined that the torque amplification range is ended. The reference value eref is set to a value (e.g., 0.8) enabling to determine whether the torque amplification range is ended.

When the result in S38 is affirmative, the program proceeds to S40, in which a change amount DNIN of the input rotation speed NIN (i.e., a change amount (variation) of the engine speed NE) is calculated. The change amount DNIN is obtained by subtracting the input rotation speed NIN detected in the present program loop from that detected in the previous program loop.

The program proceeds to S42, in which it is determined whether the speed of the boat 12 remains stable at the maximum speed or thereabout after completing acceleration. This determination is made by comparing an absolute value of the calculated change amount DNIN with a prescribed value (threshold value) DNINref to determine whether the absolute value is equal to or less than the prescribed value DNINref, and when the result is affirmative, determining that the speed of the boat 12 is stable at the maximum value or thereabout. The prescribed value DNINref is set to a value (e.g., 500 rpm) enabling to determine whether the speed of the boat 12 remains stable at the maximum value or thereabout after completing acceleration, specifically, the change amount DNIN is relatively small.

When the result in S42 is affirmative, the program proceeds to S44, in which the torque converter 44 is controlled in the lockup-ON mode, i.e., the lockup clutch 44d is made ON. As a result, since the crankshaft 52 of the engine 30 and the drive shaft 42 is directly connected, slippage or the like of the torque converter 44 can be prevented and the speed of the boat 12 reaches the maximum speed (in a range of the engine performance), thereby improving acceleration performance.

After the process of S44, the program proceeds to S46, in which the bit of the torque converter amplification determination flag is reset to 0.

When the result in S38 or S42 is negative, since it means that the torque amplification range is not ended or saturated, or the speed of the boat 12 does not become stable at the maximum speed or thereabout, the process of S44, S46, etc., is skipped and the program is terminated.

When the result in S10 is affirmative, i.e., the shift position is neutral, the program proceeds to S48, in which the torque converter 44 is controlled in the lockup-ON mode, i.e., the lockup clutch 44d is made ON, and to S50, in which the bit of the torque converter amplification determination flag is reset to 0.

When the result in S16 is affirmative, i.e., the engine 30 is in the decelerating condition, the program proceeds to S52, in which the torque converter 44 is controlled in the lockup-OFF mode, i.e., the lockup clutch 44d is made OFF, and to S54, in which the bit of the torque converter amplification determination flag is reset to 0 and the program is terminated.

As stated above, this embodiment is configured to have an apparatus for (and a method of) controlling an outboard motor (10) mounted on a stern of a boat (12) and having an internal combustion engine (30) to power a propeller (60), a drive shaft (42) that connects the engine and the propeller, and a torque converter (44) that is interposed between the engine and the drive shaft and is equipped with a lockup clutch (44d), comprising a throttle opening detector (throttle opening sensor 80, ECU 94, S12) that detects throttle opening (TH) of a throttle valve (38) of the engine, a throttle opening change amount calculator (ECU 94, S14) that calculates a change amount (DTH) of the calculated throttle opening, and a clutch ON unit (ECU 94, S20 to S28) that makes the lockup clutch ON when the calculated change amount is equal to or greater than a predetermined value (DTHref), and keeps the lockup clutch ON during a predetermined time period (tm).

With this, it becomes possible to make and hold the lockup clutch 44d ON during a predetermined time period immediately after acceleration of the engine 30, so that the output of the engine 30 is directly transmitted to the drive shaft 42 to enhance grip of the propeller 60. Accordingly, the speed of the boat 12 (boat speed) promptly starts increasing, thereby improving acceleration performance immediately after speed of the engine 30 is accelerated.

The apparatus further includes an engine speed detector (crank angle sensor 86, ECU 94, S22) that detects speed (NE) of the engine, and a predetermined time period changer (ECU 94, S24) that changes the predetermined time period depending on the speed of the engine. With this, it becomes possible to appropriately determine the time period during which the lockup clutch 44d is kept ON in accordance with the engine speed NE, thereby further improving acceleration performance immediately after speed of the engine 30 is accelerated.

In the apparatus, the predetermined time period changer changes the predetermined time period to decrease as the speed of the engine increases (S24). With this, it becomes possible to determine the time period during which the lockup clutch 44d is kept ON in accordance with the engine speed NE more appropriately.

In the apparatus, the predetermined value is a value enabling to determine whether the engine is accelerating (S20). With this, it becomes possible to make and hold the lockup clutch 44d ON during a predetermined time period immediately after acceleration of the engine 30.

It should be noted that, although the predetermined value DTHref, prescribed value DNINref, displacement of the engine 30 and other values are indicated with specific values in the foregoing, they are only examples and not limited thereto.

Japanese Patent Application No. 2008-270213 filed on Oct. 20, 2008 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising:
   a throttle opening detector that detects throttle opening of a throttle valve of the engine;
   a throttle opening change rate calculator that calculates a change rate of the detected throttle opening per unit time; and
   a clutch ON unit that makes the lockup clutch ON when the calculated change rate is equal to or greater than a predetermined value that indicates the engine is in an accelerating condition, and keeps the lockup clutch ON during a predetermined time period immediately after an acceleration of the engine as determined by calculated change rate being equal to or greater than the predetermined value.

2. The apparatus according to claim 1, further including:
   an engine speed detector that detects speed of the engine; and
   a predetermined time period changer that changes the predetermined time period depending on the speed of the engine.

3. The apparatus according to claim 2, wherein the predetermined time period changer changes the predetermined time period to decrease as the speed of the engine increases.

4. A method of controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising steps of:
   detecting throttle opening of a throttle valve of the engine;
   calculating a change rate of the detected throttle opening per unit time; and
   making the lockup clutch ON when the calculated change rate is equal to or greater than a predetermined value that indicates the engine is in an accelerating condition, and keeping the lockup clutch ON during a predetermined time period immediately after an acceleration of the engine as determined by calculated change rate being equal to or greater than the predetermined value.

5. The method according to claim 4, further including steps of:
   detecting speed of the engine; and
   changing the predetermined time period depending on the speed of the engine.

6. The method according to claim 5, wherein the step of changing changes the predetermined time period to decrease as the speed of the engine increases.

7. An apparatus for controlling an outboard motor mounted on a stern of a boat and having an internal combustion engine to power a propeller, a drive shaft that connects the engine and the propeller, and a torque converter that is interposed between the engine and the drive shaft and is equipped with a lockup clutch, comprising:
   a throttle opening detector that detects throttle opening of a throttle valve of the engine;
   a throttle opening change rate calculator that calculates a change rate of the detected throttle opening per unit time;
   an engine speed detector that detects speed of the engine;
   a predetermined time period changing unit that sets a predetermined time period based on the speed of the engine; and
   a clutch ON unit that makes the lockup clutch ON when the calculated change rate is equal to or greater than a predetermined value that indicates the engine is in an accelerating condition, and keeps the lockup clutch ON during the predetermined time period immediately after an acceleration of the engine as determined by calculated change rate being equal to or greater than the predetermined value,
   wherein the predetermined time period changing unit decreases the predetermined time period as the speed of the engine increases.

* * * * *